May 7, 1929.  J. L. BATTENFELD  1,712,130
SWIVEL COUPLING
Filed May 14, 1923

INVENTOR.
Jay L. Battenfeld.
BY
Jay Oberlin + Fay
ATTORNEYS

Patented May 7, 1929.

1,712,130

UNITED STATES PATENT OFFICE.

JAY L. BATTENFELD, OF CLEVELAND, OHIO, ASSIGNOR TO THE JOHNSTON & JENNINGS COMPANY, OF CLEVELAND, OHIO, A CORPORATION OF OHIO.

SWIVEL COUPLING.

Application filed May 14, 1923. Serial No. 638,903.

The present invention relates to a swivel coupling for hose lines and more particularly relates to a coupling suitable for attachment to molding machines, vibrators, pneumatic tools and the like. The present coupling is simple in construction and embodies but few parts which are easily assembled and replaced. To the accomplishment of the foregoing and related ends, said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

In said annexed drawing:—

Figure 1:
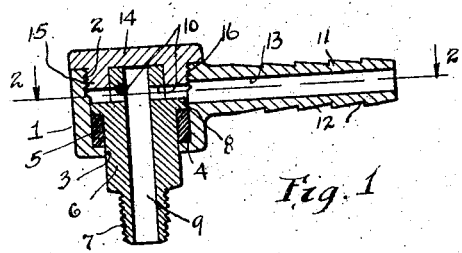
Figure 2:
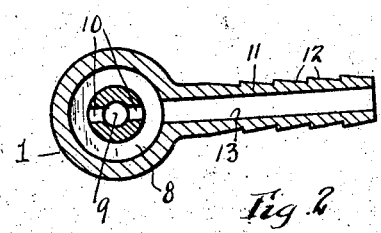

Fig. 1 is a vertical sectional view through the device; Fig. 2 is a sectional view on the line 2—2 of Fig. 1; and Fig. 3 is a sectional view similar to Fig. 1 but showing a modified form of coupling.

As shown in the drawings, the coupling comprises a small cylindrical casing or cup 1 open at the top and provided with internal threads 2. The bottom of the casing is provided with a central aperture 3 forming an annular shoulder or seat 4 to receive a packing washer 5. Rotatably mounted in the casing is a swivel member or plug 6 which has a reduced lower end 7 exteriorly threaded and adapted to be secured to the machine to which the coupling is connected. This plug extends through the aperture 3 and near the top is provided with a flange 8 loosely fitting the interior of the casing and resting on the washer 5. Above the flange 8 the plug is smaller in diameter and this upper end extends nearly to the level of the top of the casing.

The plug has a longitudinal bore or air passage 9 extending therethrough and just above the flange is provided with a series of radial apertures 10 communicating with the bore. At one side the casing is provided with a hollow hose connecting tube 11 having its exterior formed with a series of cone shaped portions 12, the tube being adapted to fit within a hose in which it will be clamped in the usual manner. The aperture 13 through the coupling tube is in line with the radial apertures 10 in the plug, thus allowing passage of the air through the swivel coupling. To hold the plug in place in the casing and to prevent air leakage, a cover 14 is provided having a depending annular flange 15 exteriorly threaded as at 16 and adapted to be screwed tightly into the casing, the extending end of the plug being received within the flange to hold the plug in alignment in the casing. The air pressure within the cup above the plug flange 8 forces the plug and flange down tightly on to the packing washer preventing air leakage when in use.

Figure 3:
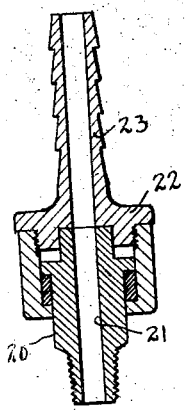

In Fig. 3 a slightly modified form of coupling is shown in which the plug 20 has no radial apertures but only a longitudinal aperture 21. In this case the cover 22 is provided with the hollow hose coupling tube 23 connecting directly with the bore in the plug. In other respects the coupling is identical with the first form.

The present device swivels or turns easily as the plug member is loosely mounted in the casing, the air pressure being adapted to seal the plug. The present coupling is particularly adapted to intermittent service where the rotating or turning of the coupling is done when the air pressure is cut off as of course the air pressure against the flange makes it more difficult to move the parts relative to each other. The coupling has only four parts and is easily assembled. The parts need only have a loose fit except for the cover threads and thus may be cheaply manufactured.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

In a swivel coupling, the combination of a cup shaped casing open at the top and having a central aperture in the bottom leaving an annular shoulder, the cup being interiorly threaded adjacent the top and being provided with a hollow hose connecting tube communicating with the interior of the cup, a packing washer mounted in said cup on said shoulder, a swivel plug member having a longitudinal air passage and an integrally formed annular flange adapted to rest on said washer, said plug being provided with ra dial holes above said flange communicating with said air passage, and a cover for said cup having a downwardly extending externally threaded flange adapted to engage with said threaded portion of said cup, said flange being bored to provide a recess to receive the upper portion of said swivel plug member to hold the same in alignment and to prevent upward movement of the same in said cup, the top of said swivel plug engaging the bottom of said recess.

Signed by me this 11th day of May, 1923.

JAY L. BATTENFELD.